(No Model.) 2 Sheets—Sheet 1.
C. F. ADAMS.
GAS BURNING COOKING STOVE OR RANGE.
No. 472,842. Patented Apr. 12, 1892.
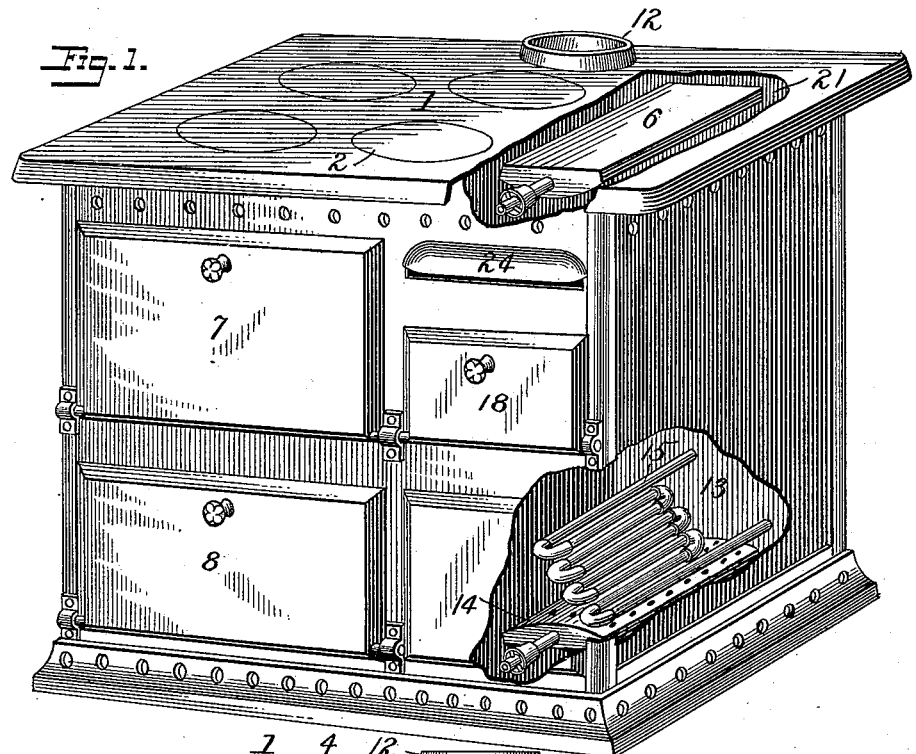
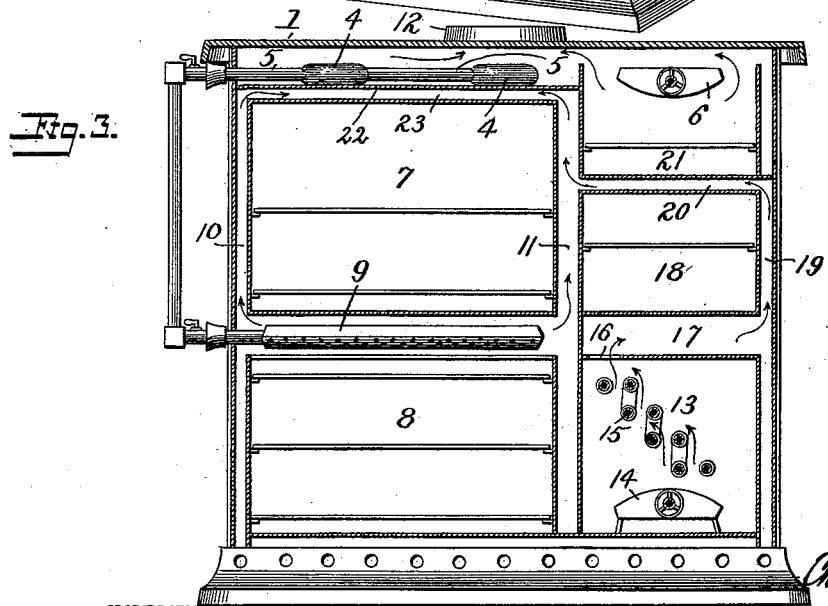
WITNESSES
INVENTOR
Attorney (No Model.) 2 Sheets—Sheet 2.
C. F. ADAMS.
GAS BURNING COOKING STOVE OR RANGE.
No. 472,842. Patented Apr. 12, 1892.
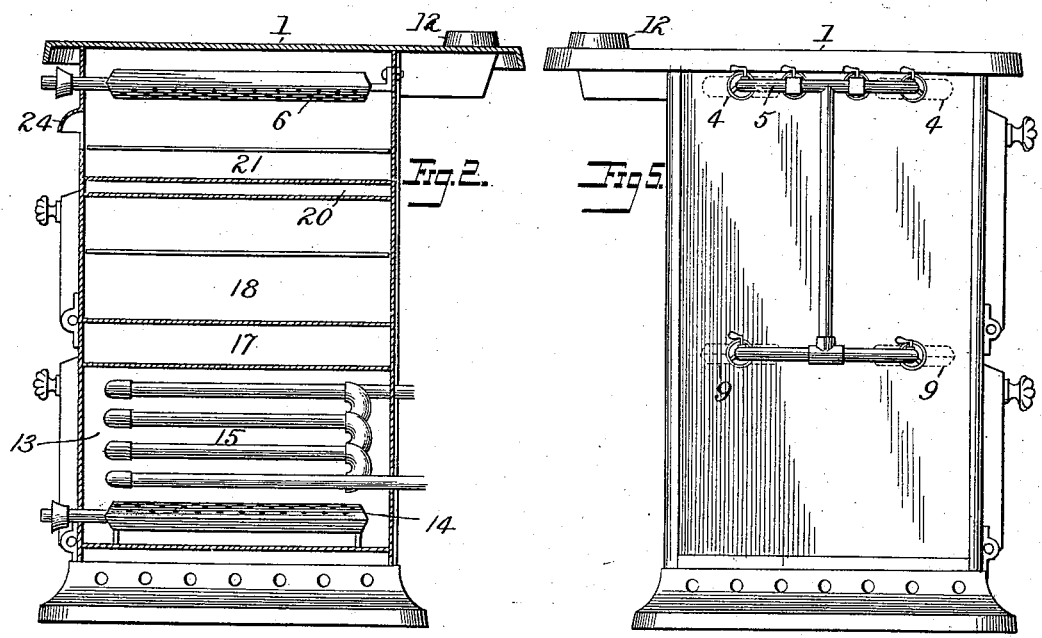
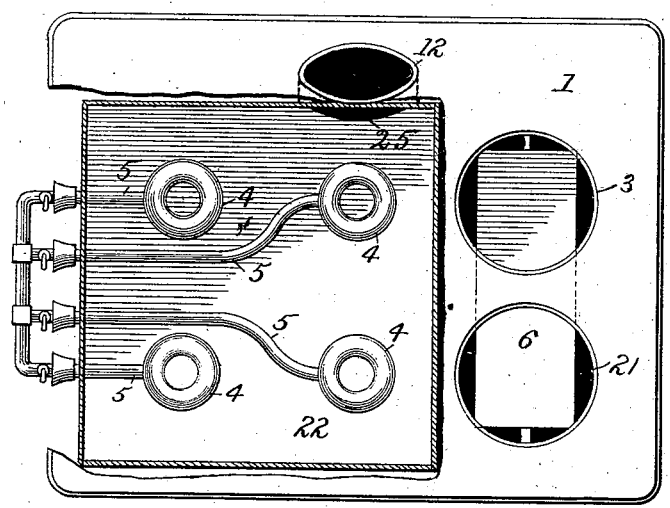
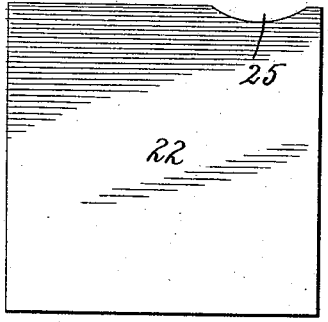
WITNESSES
Charles F. Adams
INVENTOR
by J. S. Barker
his Attorney.

UNITED STATES PATENT OFFICE.

CHARLES F. ADAMS, OF BUFFALO, NEW YORK, ASSIGNOR TO SHERMAN S. JEWETT & CO., OF SAME PLACE.

GAS-BURNING COOKING STOVE OR RANGE.

SPECIFICATION forming part of Letters Patent No. 472,842, dated April 12, 1892.

Application filed March 9, 1891. Serial No. 384,286. (No model.)

*To all whom it may concern:*

Be it known that I, CHARLES F. ADAMS, a citizen of the United States, residing at Buffalo, in the county of Erie and State of New York, have invented certain new and useful Improvements in Gas-Burning Cooking Stoves or Ranges, of which the following is a specification.

My invention has for its object to produce a cooking stove or range which is adapted for the burning of gaseous or hydrocarbon-fluid fuel, and wherein the heat developed by such burning shall be economically utilized.

To carry out these objects, the invention consists of a cooking stove or range having certain novel arrangements of apartments for cooking and heating purposes and flues, in combination with burners so placed in relation to these apartments that the heat developed by the burning fuel will be economically utilized.

In order that my invention may be the better understood, I have illustrated one form of it in the accompanying drawings, wherein—

Figure 1 is a perspective view of a gas-burning cooking stove or range containing my invention, part of the outside casing and top plate being broken away. Fig. 2 is an end view partly broken away. Fig. 3 is a central transverse section of the range. Fig. 4 is a top plan view, part of the top plate being broken away. Fig. 5 is a view of the end opposite to that shown in Fig. 2, parts being broken away. Fig. 6 is a plan view of the top flue-plate.

The form of stove which I have chosen to show as embodying my invention has a six-hole top plate 1. Below four of the holes 2 of this top plate are arranged the four circular burners 4, each having an independent gas-supply pipe 5. Directly under the other two holes 3 is arranged a flat burner 6, perforated on its lower side, so that the flame is thrown downward. This burner is used for broiling and toasting, being situated above the broiler-compartment 21, and, being directly below the top plate of the stove, the products of combustion therefrom pass in contact with the under side of this plate on their way to the escape-flue and thus serve to heat it.

7 designates the baking-oven, and 8 the roaster, they being situated one above the other, with the burners 9 placed between them, so that the baking-oven has a bottom as well as side and top heat, while the roaster receives its heat from above. The products of combustion from the burners 9 pass into the end flue 10 and the central flue 11, situated, respectively, at the sides of the baking-oven, from which flues they pass into the space or flue 23 above the oven 7 and below the top flue-plate 22, from which flue 23 they go through the opening 25 in the plate 22 to the escape flue or pipe 12. This top flue-plate serves to prevent the products of combustion from the lower burners from passing into the space directly under the top plate 1, where they would interfere with the combustion at the burners 4, and, further, would tend to cause fumes to escape into the room.

13 represents a compartment in the lower part of the range, opposite the roaster 8, wherein are arranged a gas-burner 14, and a coil of pipes 15, which form a hot-water generator, and which may be connected at either end or side with a hot-water-storage tank or a circulating heating system.

The opening 16 for the escape of the products of combustion from the burner 14 is preferably through the top wall of the compartment 13 and along its inner portion, leading into a horizontal flue 17, arranged between the top of the water-heating compartment 13 and the warming-oven 18. The coil or nest of pipes 15 is arranged in a series extending diagonally across the compartment 13 from a position over the burner 14 upward and inward toward the opening 16. This arrangement places the pipes in the path of the products of combustion from the burner 14, and thus utilizes the heat therefrom to its fullest extent. It will be evident that the escape-flue 16 might be arranged in the upper outer corner of the compartment 13 and lead directly into the flue 19, in which case the series of pipes 15 would incline or extend diagonally outward instead of inward.

The warming-oven 18 is surrounded by the flues 17, 19, and 20, which take the products of combustion from the water-heating burner and are arranged, respectively, below, at the outer side, and above the oven, and the central flue 11, which, as has been described, takes the products of combustion from the burners 9 and is situated between the baking-oven and the inner side of the warming-oven. The flue 20 leads into the flue 11 and is below the broiler-compartment 21 and thence carries the products of combustion from the broiler-compartment 21, which, as has been described, the said compartment at or near one side thereof and the said coil of pipes being arranged above the burner and extending as a series diagonally across the compartment toward the exit-opening therefrom, the warming-oven above the said burner and the said coil of pipes being arranged above the burner and extending as a series diagonally across the compartment toward the exit-opening therefrom, the warm-